J. A. Dayton,
Elevator,
N° 65,180. Patented May 28, 1867.
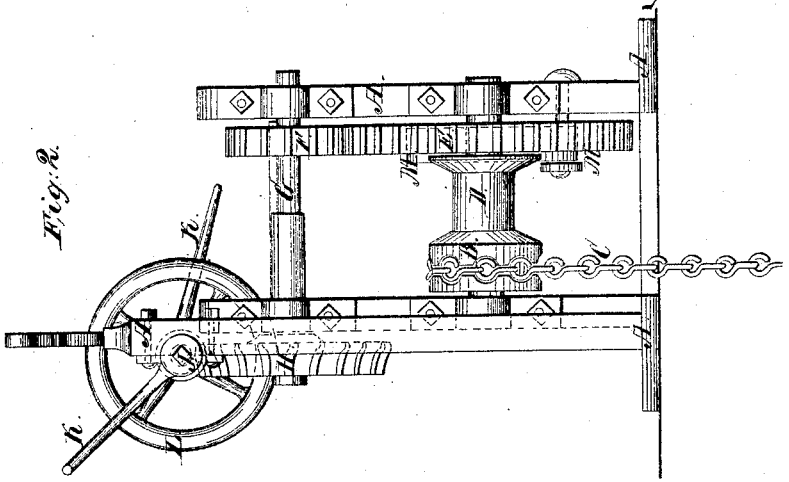
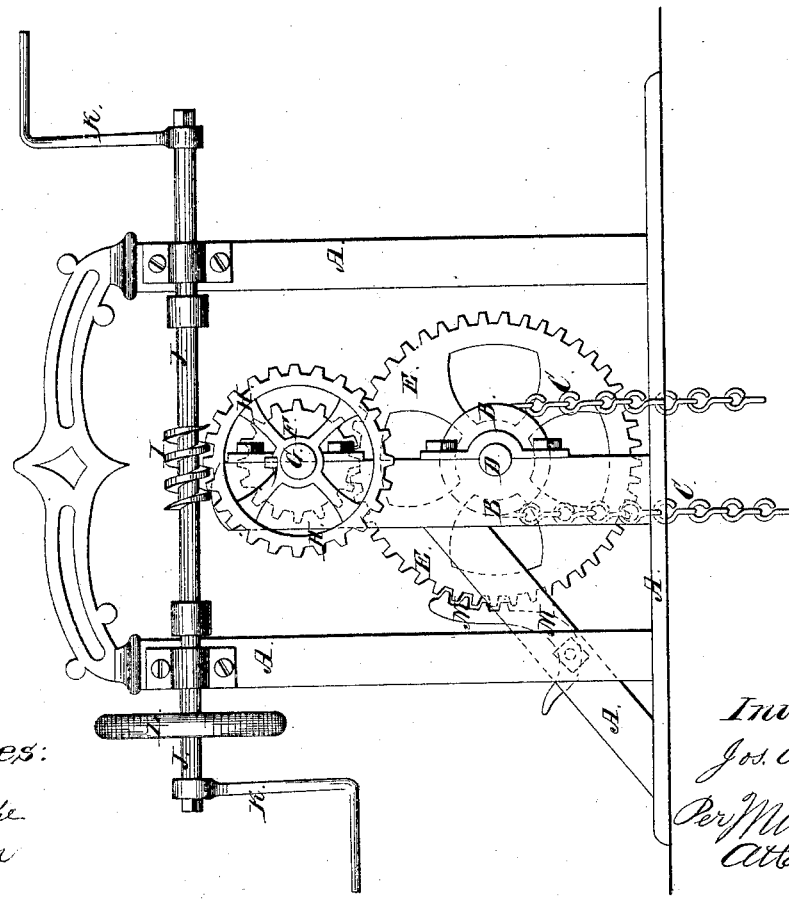
Witnesses:
Theo Tusche
Wm Truwm
Inventor:
Jos. A. Dayton
Per Munn & Co
Attorneys

United States Patent Office.

JOSEPH A. DAYTON, OF NEW LONDON, CONNECTICUT, ASSIGNOR TO HIMSELF AND JOSEPH STARR, OF SAME PLACE.

Letters Patent No. 65,180, dated May 28, 1867.

IMPROVEMENT IN HOISTING APPARATUS.

*The Schedule referred to in these Letters Patent and making part of the same.*

TO ALL WHOM IT MAY CONCERN:

Be it known that I, JOSEPH A. DAYTON, of New London, in the county of New London, and State of Connecticut, have invented a new and improved Hoisting Apparatus; and I do hereby declare that the following is a full, clear, and exact description thereof, which will enable others skilled in the art to make and use the same, reference being had to the accompanying drawings, forming part of this specification, in which—

Figure 1 is a side view of my improved hoisting apparatus.

Figure 2 is an end view of the same.

Similar letters of reference indicate like parts.

My invention has for its object to furnish an improved machine for use in storehouses and other places for hoisting heavy weights with a comparatively small exertion of power, and which shall be simple in construction, strong, and not liable to get out of order; and it consists of the apparatus formed by the combination of the chain-wheel, gear-wheels, shafts, endless screw, and crank or cranks with each other and with the frame of the machine, and in the peculiar construction of the pawl, so that it may hold the machine from revolving in either direction, the whole being constructed and arranged as hereinafter more fully described.

A is the frame of the machine, which is of great strength, is securely braced, and is set over the hatchway through which the hoisting is designed to be done. To the frame A, directly above the hatchway, is pivoted the chain-wheel B, the face of which is so constructed as to receive and hold the links of the hoisting-chain C, so as to effectually guard against slipping. To one end of the shaft D of the chain-wheel B is attached a large and strong gear-wheel, E, into the teeth of which mesh the teeth of the small gear-wheel F attached to the end of the shaft G. The shaft G revolves in bearings in the frame A of the machine, and to its other end is attached the large gear-wheel H, the teeth of which are so formed as to fit the thread of the endless screw I formed upon the shaft J. The shaft J revolves in bearings in the frame A of the machine, and has a crank, K, attached to one or both of its ends. The shaft J may have a balance-wheel, L, attached to it, and, if desired, the cranks K may be replaced by a wheel operated by a rope. M is the pawl, which is pivoted to the side of the frame A, and has teeth formed upon its forward side corresponding with the teeth of the wheel E, so that it may hold the said wheel stationary and prevent its revolution in either direction. By this construction of the apparatus it can be revolved in either direction to raise the weight, so that after raising one load it will not be necessary to run the same end of the chain down again before another load can be attached, but the load can be attached to either end of the chain C, so that no time need be lost.

What I claim as new, and desire to secure by Letters Patent, is—

An improved hoisting apparatus, formed by the combination of the chain-wheel B, shaft D, gear-wheels E F, shaft G, gear-wheel H, endless screw I, shaft J, and crank K, or their equivalent, with each other and with the frame A of the machine, substantially as herein shown and described, and for the purpose set forth.

JOSEPH A. DAYTON.

Witnesses:
R. P. HUNTLEY,
D. H. CHAPPELL.